United States Patent  [15] 3,684,374
Humphrey  [45] Aug. 15, 1972

[54] FOCUS DETECTOR
[72] Inventor: William E. Humphrey, Oakland, Calif.
[73] Assignee: Humphrey Research Associates, Oakland, Calif.
[22] Filed: July 29, 1970
[21] Appl. No.: 59,222

[52] U.S. Cl. .................. 356/4, 356/163, 250/211 R, 250/220 M
[51] Int. Cl. ............................................. G01c 3/08
[58] Field of Search ... 356/4, 163; 250/211 R, 220 M

[56] References Cited

UNITED STATES PATENTS

| 3,437,815 | 4/1969 | Bleicher | 250/211 |
| 2,678,401 | 5/1954 | Jaeger | 250/211 |
| 3,529,528 | 9/1970 | Leitz | 356/4 |
| 3,519,349 | 7/1970 | Berthold | 356/4 |
| 3,102,227 | 8/1963 | De Gier | 338/15 |
| 3,244,889 | 4/1966 | Preston et al. | 338/15 |

FOREIGN PATENTS OR APPLICATIONS

| 243,342 | 1/1961 | Australia | 338/15 |

Primary Examiner—Benjamin A. Borchelt
Assistant Examiner—S. C. Buczinski
Attorney—Townsend and Townsend

[57] ABSTRACT

Correspondingly located portions of images projected on separate planes are compared for coincidence by correspondingly located photosensitive elements on each of the planes. The photosensitive elements on each corresponding image location on each plane are connected in separate circuits. An electrical potential is applied across these separate circuits. This produces a first aggregate current flow at image coincidence and a second easily distinguishable aggregate current flow at image non-coincidence. By the expedient of offsetting first and second electrically connected groups of the corresponding photosensitive elements on each plane in opposing directions and isolating the aggregate current flow of these groups, the amount and direction of image displacement can be determined in a base leg optical device. When these first and second electrically connected groups of photosensitive elements are connected as one of the sides of a bridge circuit, automating ranging and focusing can be achieved as a function of circuit potential at the circuit bridge.

15 Claims, 15 Drawing Figures

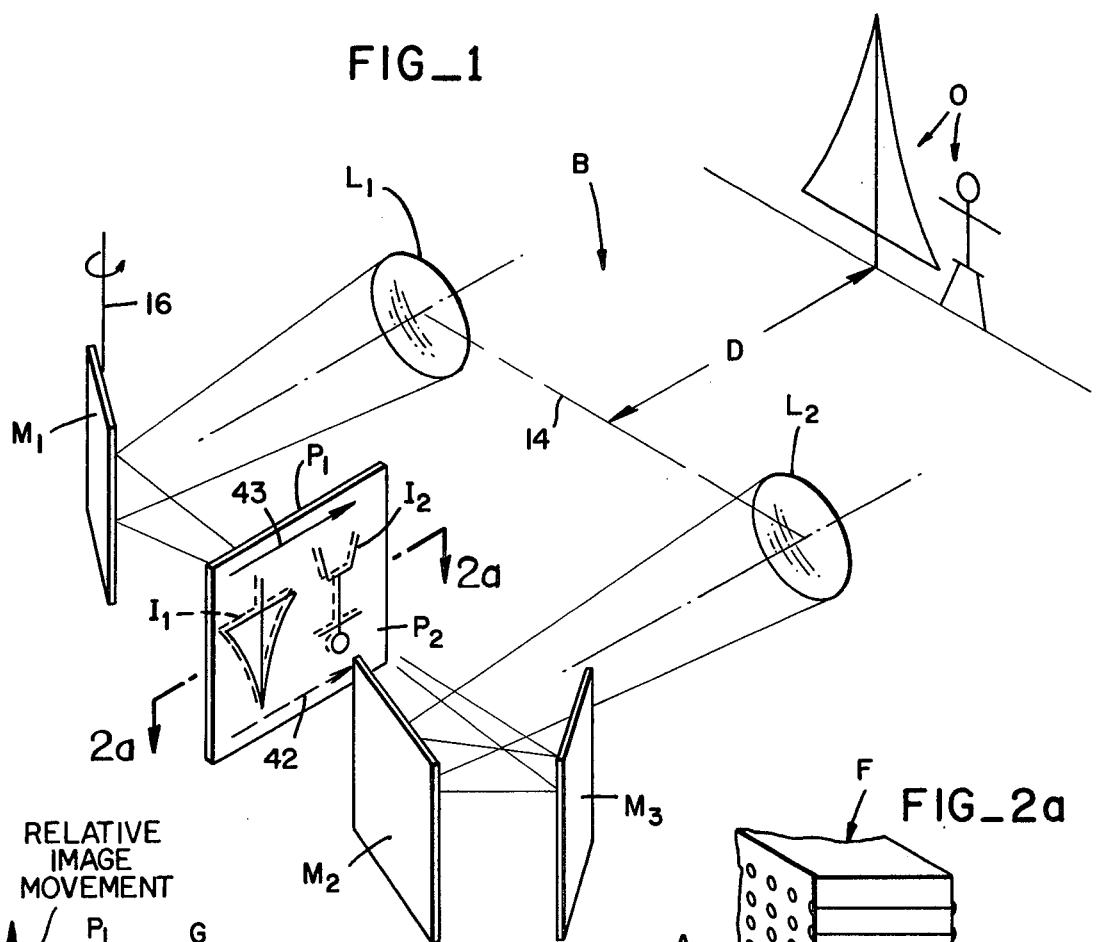
FIG_1
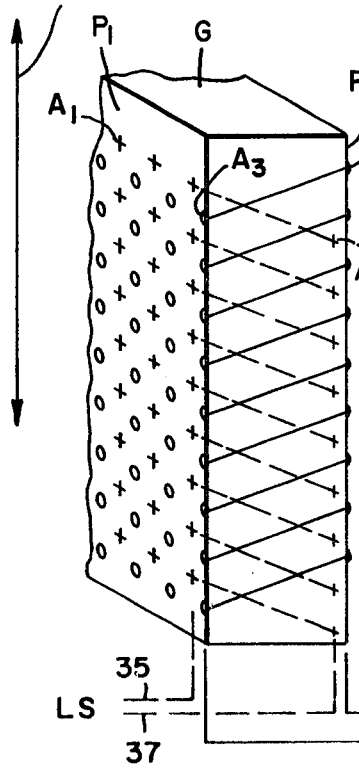
FIG_3a
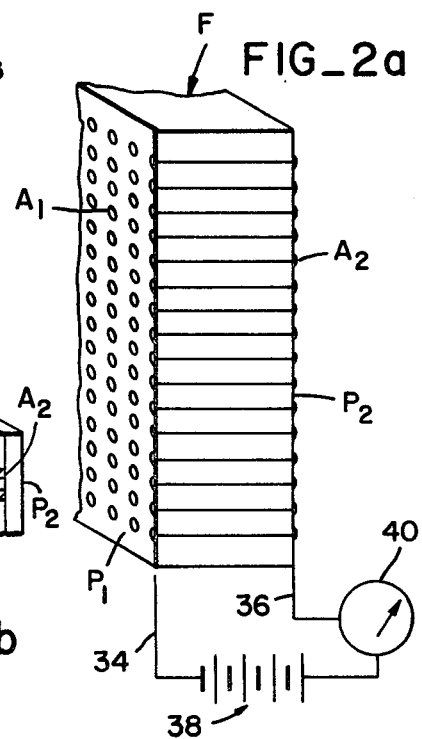
FIG_2a
FIG_2b
INVENTOR.
WILLIAM E. HUMPHREY
BY
Townsend and Townsend
ATTORNEYS

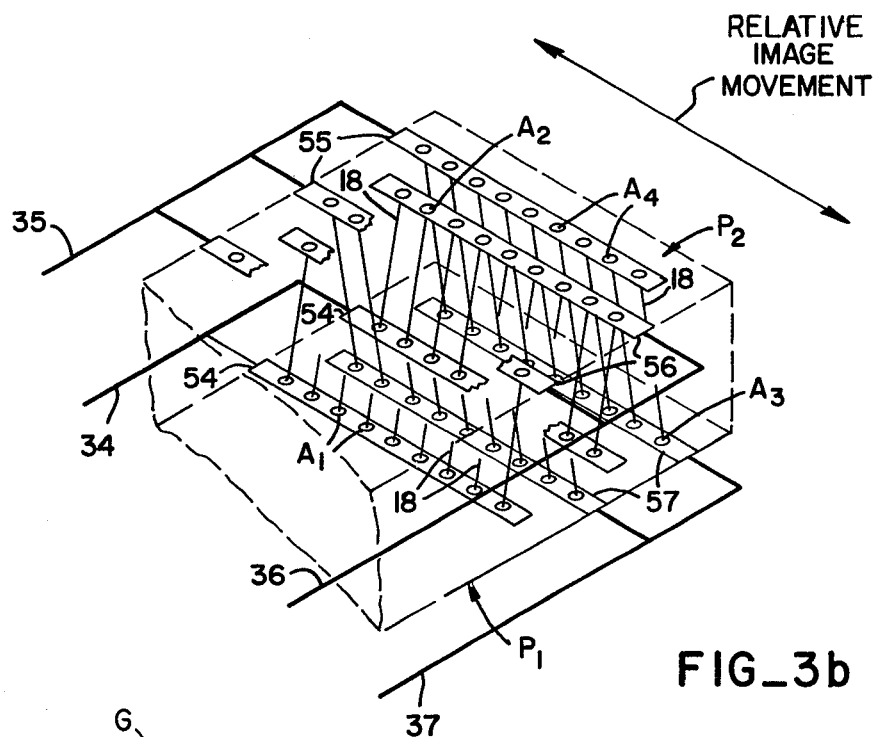
FIG_3b
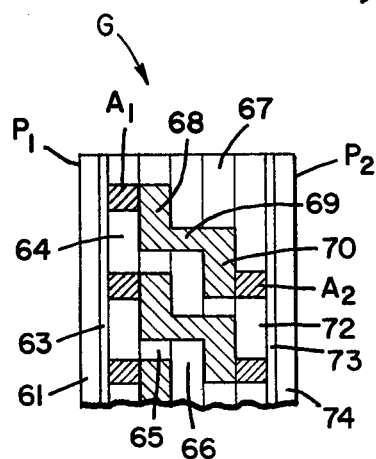
FIG_3c

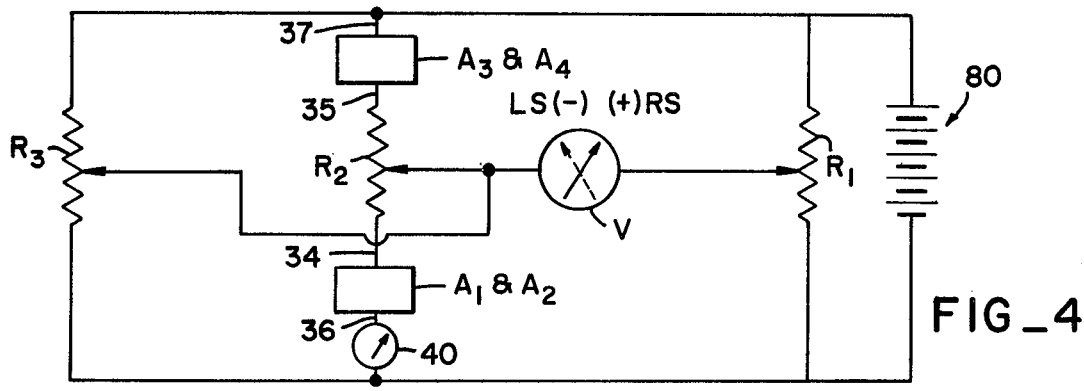
FIG_4
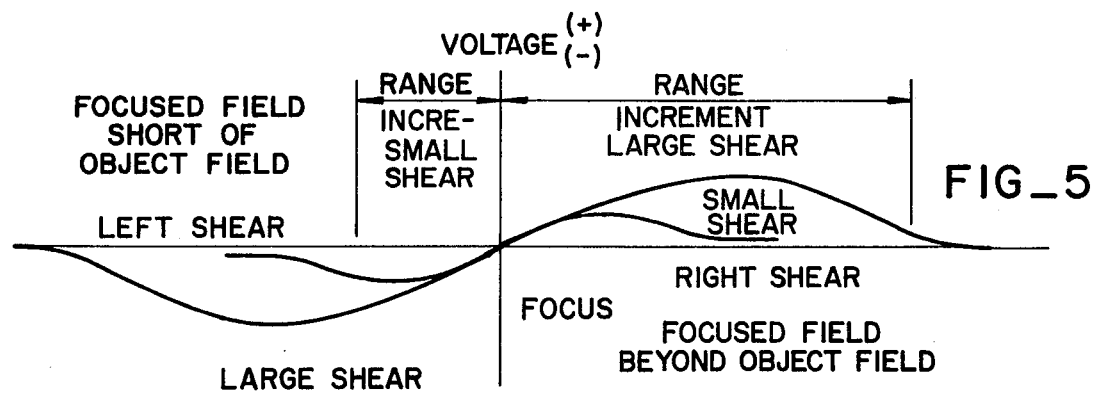
FIG_5
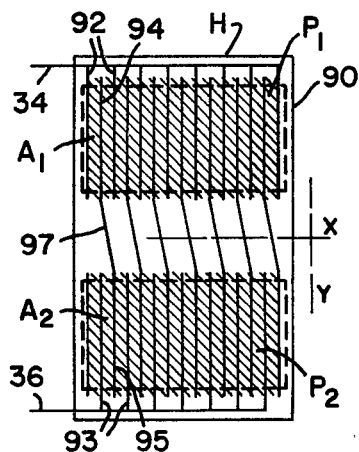
FIG_7
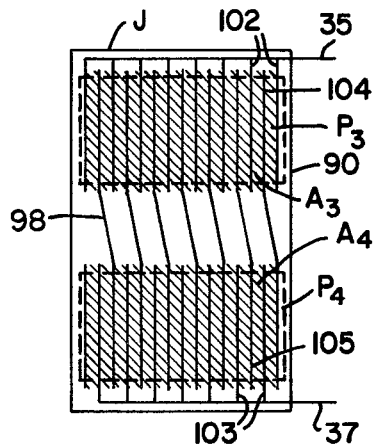
FIG_8
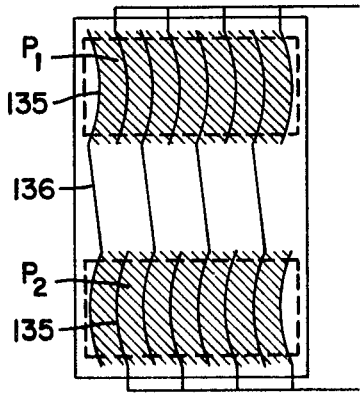
FIG_9
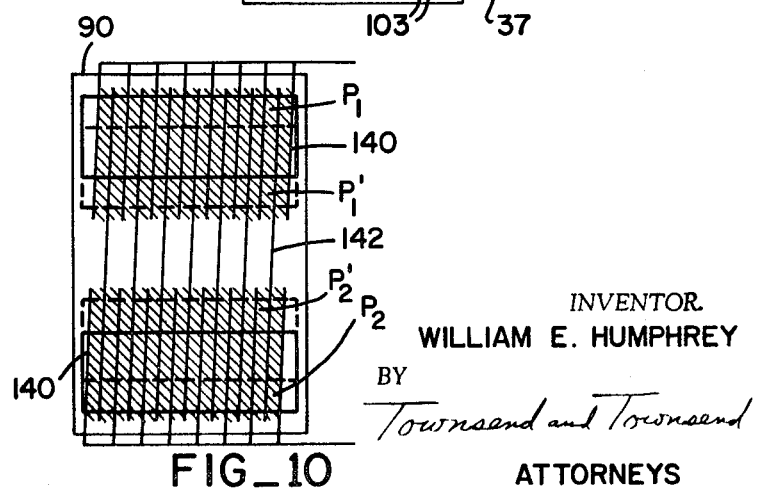
FIG_10
INVENTOR.
WILLIAM E. HUMPHREY
BY Townsend and Townsend
ATTORNEYS

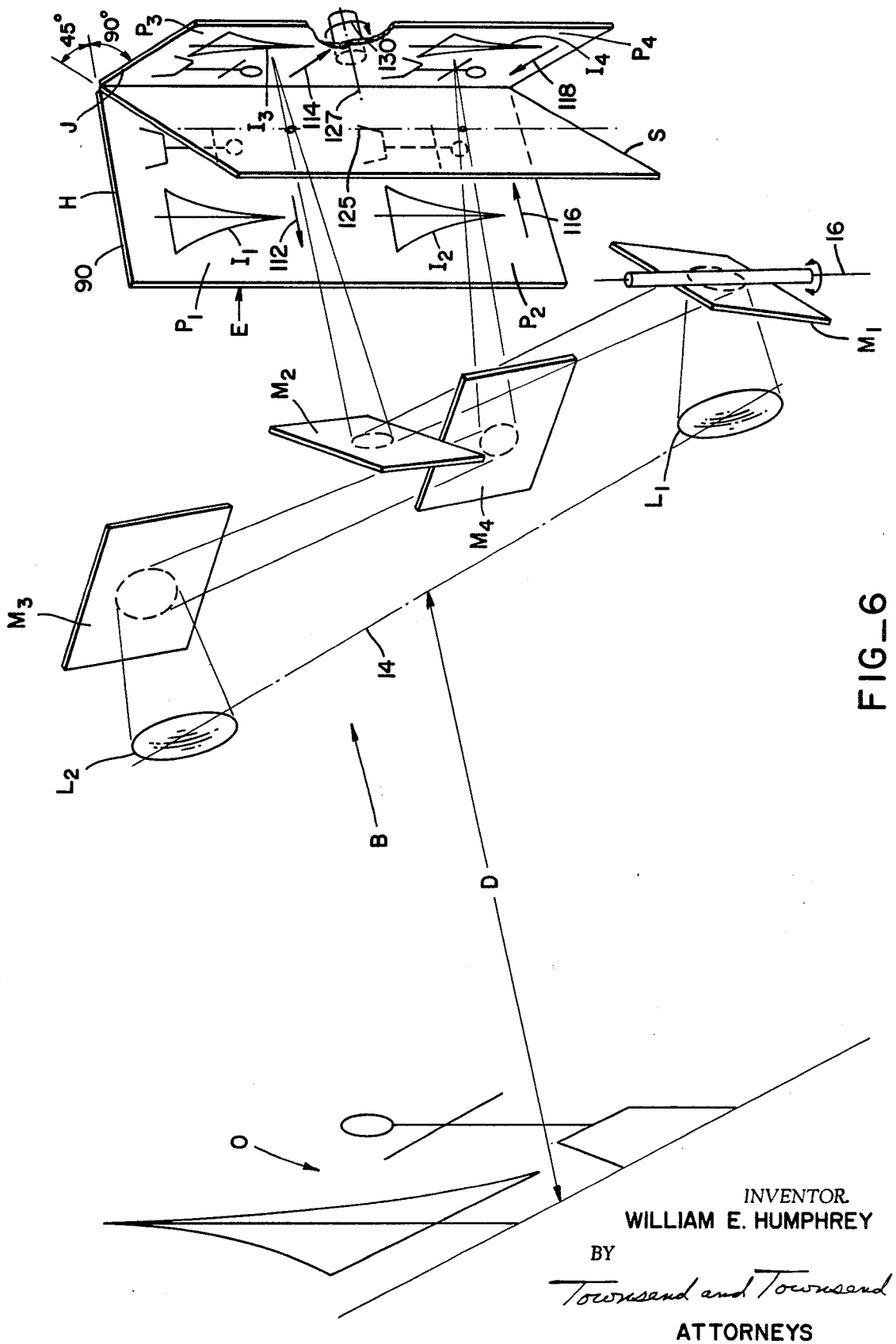
FIG_6

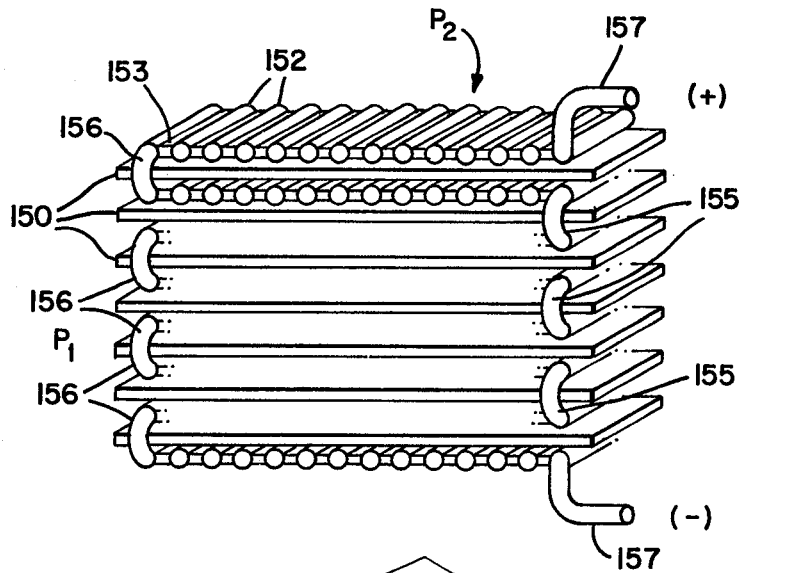
FIG_11
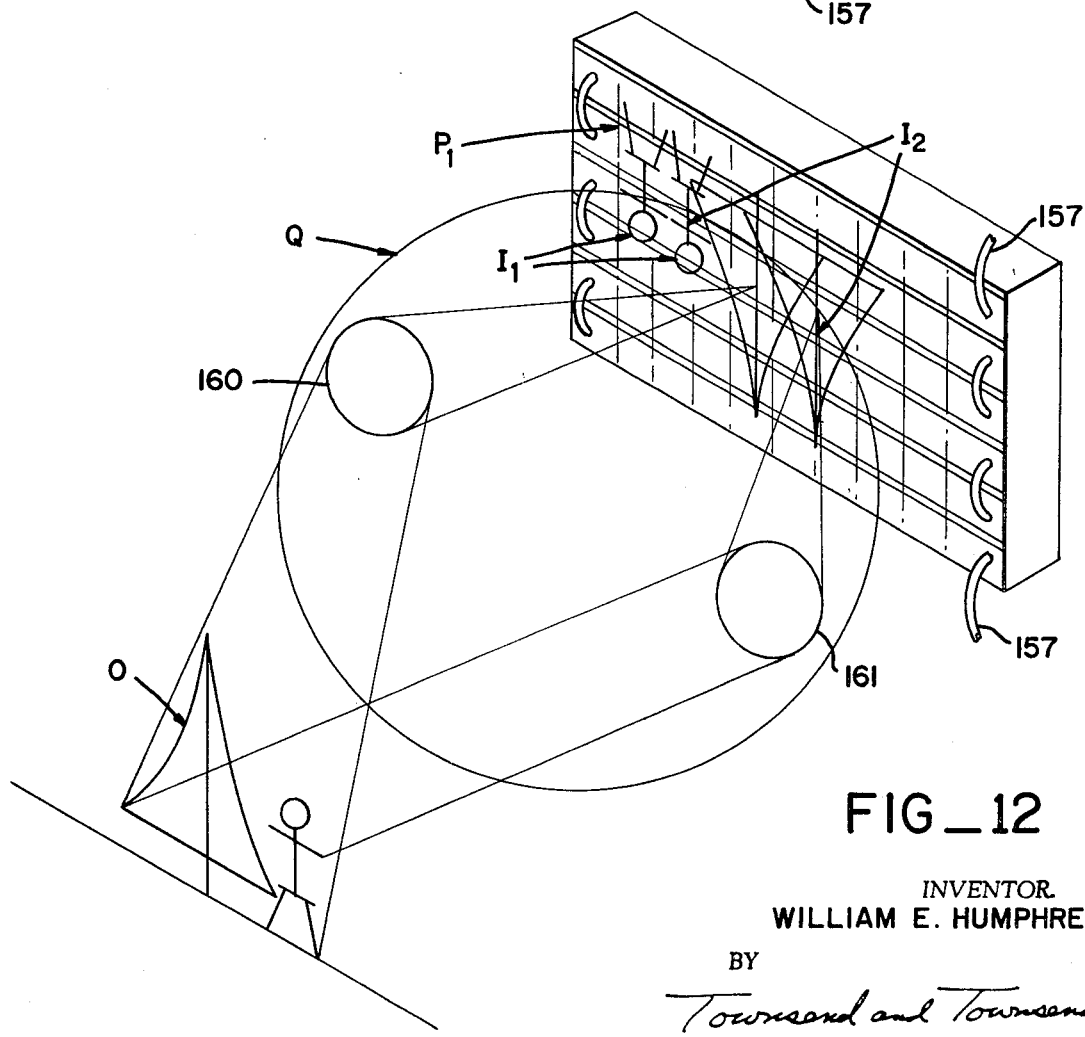
FIG_12
INVENTOR
WILLIAM E. HUMPHREY
BY
Townsend and Townsend
ATTORNEYS

FOCUS DETECTOR

This invention relates to a focus detector and more particularly, a focus detector which is useful when incorporated within an optical device having paired viewing points separated by a base leg interval therebetween.

Heretofore, focus detecting devices have been extremely sensitive to image interfaces having adjoining areas of high light contrast. Given a lens system with a limited depth of field, focus frequently occurs in the image plane of the areas of high light contrast; the image plane in which the majority of the surfaces appear is frequently neglected. This is because the latter image plane often incorporates images of relatively low light contrast.

Moreover, many existing systems operate on a secondary effect of photosensitive elements when they detect a focused image. Typically, these elements display an electrical current flow change which varies as the square root of the improved light intensity of a focused image over a non-focused image. Unfortunately, there are many optical applications in which such detection by means of secondary photosensitive effects are wholly unsatisfactory. Such applications include the focusing of images which have low light contrast and low light levels.

Finally, existing photosensitive focus detectors commonly have no way to detect whether their focus image plane is too far or too near to the object being focused. In such apparatuses hunting circuits must be employed to detect the maximum or minimum current flows coincident with a focused state. Difficulty in such systems in encountered in determining the direction in which initial focus correction should first occur. Moreover, the point of focus is often incapable of being precisely located, resulting in continuous circuit hunting with a resultant poor focus.

An object of this invention is to provide a focus detector having paired image planes with apparatus for correlating image correspondence at corresponding points throughout the image planes. Accordingly, corresponding photosensitive elements on each of the planes are connected in separate electrical circuits. All of these separate electrical circuits are in turn connected for measurement of the aggregate current flow therethrough, typically by being connected in parallel. When the aggregate current flow is measured, a distinctive current flow change can be detected at positions of image coincidence.

An advantage of this focus detector is that it does not sense exclusively image areas of high contrast; rather the focus detector senses that image plane having the bulk of the focused subject matter therewithin.

A further advantage is that the signal output at image coincidence is roughly proportional to the product of the light levels at the paired image surfaces. The produced signal of image coincidence is easily detectable, does not rely on secondary photosensitive effects (such as the square root of light intensity), and can be relied upon to produce focus at relatively low light levels.

Yet another advantage is that the focus detector of this invention can be relied upon to focus images having low light contrasts, such images including broad surfaces of the human face and the like.

Yet another object of this invention is to provide an image focus detector which can be readily adapted to compare the separate images generated by a base leg optical device having separate imaging viewpoints at either end of a base leg.

An advantage of the focus detector of this invention when incorporated within a base leg optical device is that it can be used in range finders, focusing apparatuses and any other optical application which triangulates two or more images of a single object.

A further object of this invention is to provide detectors at each of two imaging planes which detectors can together detect the direction of relative image displacement on each plane. Accordingly, the corresponding circuit connected photosensitive elements of the image planes are divided into two or more groups, each group being offset in its position of correspondence in a preselected opposite direction by a preselected amount. By connecting each of the groups into separate current aggregating circuits, the direction of relative image displacement between the paired image planes can be immediately detected.

An advantage of this focus detector when it is incorporated within a base leg optical device is that a signal indicating the correct movement of the focus plane is immediately provided. Hunting circuits are not required.

A further advantage of this invention when incorporated within a base leg optical device is that focal planes can be chosen from a preselected range interval; focal planes without the preselected range interval can be automatically ignored.

Yet another object of this invention is to connect the focus detector of this invention to a bridge circuit so that potential at the circuit bridge is an indication of focus.

An advantage of this focus detector when connected to a bridge circuit is that it can be tuned for operability over a wide range of light intensity.

A further advantage of this detector when connected to a bridge circuit energized with direct current is that the voltage polarity at the circuit bridge provides an indication of the necessary movement or proper correction required for focus.

Yet another object of this invention is to provide pairs of focus detectors coupled to a periscoped base leg optical device in which movement of the focus detectors triangulates the viewed object without movement of other optics within the base leg range finder.

An advantage of this embodiment is that the triangulation of the base leg optical device can be simplified.

Yet another object of this invention is to provide focus detectors for detecting dark objects on an illuminated background.

A still further object of this invention is to provide a focus detector adapted to detect illuminated objects on a dark background.

Other objects, features and advantages of this invention will become more apparent after referring to the following specification and attached drawings in which:

FIG. 1 is a perspective view of a base leg optical device showing the focus of an object O on a focus detector;

FIG. 2a is a schematic representation of the focusing detector of this invention connected to a D. C. power source and monitoring ammeter;

FIG. 2b is a perspective representation illustrating the series connection provided between two corresponding photosensitive areas on opposite sides of the focus detector of FIG. 2;

FIG. 3a is a schematic view of a focus detector capable of detecting relative displacement between two images projected on opposite sides thereof;

FIG. 3b is a perspective illustration of one construction of the focus detector of FIG. 3a;

FIG. 3c is a side-elevational section illustrating an additional construction of the focus detector of FIG. 3a;

FIG. 4 is a schematic circuit diagram of a modified bridge circuit having the focus detectors of this invention connected thereto;

FIG. 5 is a graphic illustration of the potential of the volt meter V of FIG. 4 corresponding to varied object to focused field locations;

FIG. 6 is a perspective view of an alternate base leg optical device for use with yet another embodiment of the focus detector of this invention, this detector including pairs of imaging planes;

FIG. 7 is an elevational view of a pair of imaging planes of the focus detector in FIG. 6; FIG. 8 is an elevational view of the remaining pair of imaging planes of the focus detector of FIG. 6;

FIG. 9 is an elevational view of an alternate embodiment of one of the focus detector planes used in FIG. 6; and, FIG. 10 is an elevational view of yet another embodiment of the focus detector planes used in FIG. 6;

FIG. 11 is a perspective view of yet another embodiment of a focus sensor which can be used in the focus detector of FIG. 1; and, FIG. 12 is a perspective and schematic view of a range finder and focus detector used in combination with a lens having a large pupil, the schematic illustration demonstrating the optical effects of discrete segments of the lens on the focus detector.

Referring to FIGS. 1, 2a and 2b, the general function of the focus detector can be understood. In FIG. 1, object O is shown separated from base leg optical device B by distance D. Object O is viewed through two convex lenses $L_1$ and $L_2$ located at either extremity of the base leg 14 of optical device B.

Each of the lenses $L_1$ and $L_2$ is given a focal length equivalent to the length of its light path from the lens to an imaging plane. Moreover, the lenses are commonly apertured or provided with auxiliary optics (not shown) to provide for great depth of field.

Converging light from lens $L_1$ impinges upon mirror $M_1$ and is reflectively folded to produce image $I_1$ on imaging plane $P_1$. Likewise, converging light from convex lens $L_2$ is successively folded by an even number of mirrors $M_2$ and $M_3$ to focus image $I_2$ on image plane $P_2$. As the focusing light from one of the lenses impinges on an odd number of mirrors and the focusing light from the other of the lenses impinges upon an even number of mirrors, the two images $I_1$ and $I_2$ impinge upon the respective imaging planes in back-to-back relation. Consequently, when image coincidence occurs, the illustrated tree of object O will be in overlying relation at both images $I_1$ and $I_2$; likewise, the illustrated stick figure of object O will be in overlying relation at images $I_1$ and $I_2$.

It will be appreciated that for varying locations of object O in distance from base leg optical device B, the relative positions of image $I_1$ on plane $D_1$ will change with respect to image $I_2$ on plane $P_2$. Typically, the optic path from each viewing point to object O will be triangulated to produce image coincidence. Such image coincidence can be produced by numerous methods well known in the art. These methods include angular movement of any of the illustrated mirrors (such as pivoting of mirror $M_1$ about axis 16), movement of lenses $L_1$ and $L_2$ towards and away from each other, or even relative movement of object O towards and away from the base leg optical device B.

Detection of the coincidence of images $I_1$ and $I_2$ at planes $P_1$ and $P_2$, respectively, is the main function of the focus detector of this invention. An embodiment of the focus detector is illustrated in FIGS. 2a and 2b.

Referring to FIG. 2a, focus detector F has on one side plane $P_1$ having a plurality of photosensitive areas $A_1$. On the opposite side, focus detector F has plane $P_2$ having a corresponding number of photosensitive areas $A_2$.

Referring to FIG. 2b, the series connection between corresponding photosensitive areas $A_1$ and $A_2$ can be described. Typically, a group of wires 18 surrounded by insulation 20 are potted in insulation material 22. It will be noted that only one wire 18 is shown connecting two corresponding photosensitive areas $A_1$ and $A_2$ in FIG. 2b. In the construction of photosensitive element F, such a wire will exist between each and every photosensitive area $A_1$ and extends through focus detector F to a corresponding photosensitive area $A_2$.

As illustrated in FIG. 2b, wires 18 and their insulation 20 are potted within insulating material 22 so as to protrude slightly beyond the outside surfaces of the insulating material 22. Layers 24 and 26 of conducting material C (typically copper) are placed over the outside surface of planes $P_1$ and $P_2$. This conducting material, however, does not cover the exposed ends of the wire. It will thus be seen that in order for the layers 24 and 26 to become conductive in series through wires 18, a conductive path must be provided spanning the insulation 20 about the wire 18. Such a conductive path is provided by layers of photosensitive material (typically photo-resistive cadmium sulfide) 28 and 30 on planes $P_1$ and $P_2$, respectively.

Each end of wire 18 will then have overlying its respective ends, photosensitive areas $A_1$ on plane $P_1$ connected in series with corresponding photosensitive areas $A_2$ on plane $P_2$.

Operation of the series circuits between the corresponding matrices of photosensitive areas $A_1$ and $A_2$ illustrated in FIGS. 2a and 2b can be readily understood. Assuming that an electrical potential is applied between the conductive layers 24 of plane $P_1$ and conductive layer 26 of plane $P_2$, light impinging upon areas $A_1$ and $A_2$ will allow current flow. However, where the light is not equal in intensity on either area $A_1$ or on corresponding area $A_2$, current flow will be largely restricted through the series connected areas by the highest resistance path provided at either of the areas $A_1$ or $A_2$.

The parallel connection between all of the corresponding series circuits $A_1$ and $A_2$ on the respective planes $P_1$ and $P_2$ is provided by electrical conductors 34 and 36 connected to conductive layers 24 and 26 of planes $P_1$ and $P_2$, respectively. Conductors 34 and 36 in turn have a source of power 38 (typically direct current) connected thereacross together with ammeter 40 for measuring current flow.

The response of the current flow at ammeter 40 to positions of image coincidence is believed apparent. When image coincidence of images $I_1$ and $I_2$ on the respective imaging planes $P_1$ and $P_2$ exists, all image areas of high intensity will overlie one another. Consequently, the series circuits provided between the corresponding photosensitive areas (here illustrated as photo-resistive cadmium sulfide) will become highly conductive. Naturally, conductive layers 24 and 26 will receive the aggregate flow of these respective series circuits, communicate this flow to their connected conductors 34 and 36 producing a maximum of current flow at ammeter 40.

Conversely, when image coincidence of the back-to-back images does not exist, current flow will be reduced. This will occur because the bright spots of the respective images $I_1$ and $I_2$ will not overlie one another, giving the conductive paths higher resistance. Thus the aggregate of current flow accumulated by conductive layers 24 and 26 and channeled through conductors 34 and 36 will be reduced. Current flow measured by ammeter 40 will be correspondingly reduced.

Focus detector F when incorporated within base leg optical device B of FIG. 1 is not capable of detecting whether the triangulated or focused image plane through lenses $L_1$ and L is either beyond object O or between object O and optical device B. Typically, a standard hunting circuit must be employed to detect focus. Such a hunting circuit would rotate mirror 16 in a preselected direction and monitor ammeter 40 for improved (in this case maximum) current flow. Assuming no improved current flow is detected, the direction of rotation of mirror M about axis 16 would be reversed. Such a hunting cycle would continue until maximum current flow through ammeter 40 is detected. As is apparent, the hunting circuit can be adapted to detect either current flow, or voltage potential.

Elimination of such a hunting cycle is frequently desired. This is because difficulties are commonly encountered. First, such systems commonly move for initial correction in the wrong direction, requiring detection of this erroneous movement and reversal to the correct and opposite system movement. Delay in producing image focus results. Moreover, such systems frequently have difficulty in detecting image coincidence. This results in continuous hunting in the area of image coincidence with resultant degradation of focus. Additionally, hunting systems are sensitive to overall light level fluctuations; these systems frequently hunt responsive to light level change. Further focus degradation results. An image detector which avoids these difficulties is illustrated with respect to FIG. 3a, 3b and 3c.

Referring briefly to FIG. 1, it will be noted that the images $I_1$ and $I_2$ when moving to or from their positions of coincident back-to-back relation will both move opposite to one another in the horizontal direction. Thus, it is seen that where distance D to object O is between the focused or triangulated image plane and base leg optical device B, image $I_1$ will move relative to image $I_2$ in the direction indicated by arrow 42 on image plane P. Conversely, where the distance D to object O is between the focused or triangulate image plane and base leg optical device B, the images will be displaced in an opposite relative direction. Thus, image $I_2$ will move relative to image $I_1$ in the direction shown by arrow 43 on plane $P_2$.

Referring to focus detector G illustrated schematically in FIG. 3a, direction of the relative image movement can be detected by providing two sets or groupings of photosensitive areas on each of the image planes $P_1$ and $P_2$. A first set of photosensitive areas $A_1$ (schematically shown (+)) on planes $P_1$ can be sheared or angularly displaced in one direction of image movement relative to their series connected and corresponding areas $A_2$ on plane $P_2$ (also shown schematically as (+)). Similarly, a second set of photosensitive areas $A_3$ on plane $P_1$ can be sheared in an angularly opposite direction to their series connected and corresponding photosensitive areas $A_4$ on plane $p_2$. By the expedient of comparing the current flow between two parallel circuits with one circuit including areas $A_1$ and $A_2$ and the other circuit including areas $A_3$ and $A_4$, the relative directional displacement between the images $I_1$ and $I_2$ on planes $P_1$ and $P_2$ can be instantly detected.

One construction of the detector G is illustrated in FIG. 3b. A plurality of conductive strips 54 are shown connected in parallel to conductor 34. Likewise, a plurality of conductive strips 56 are shown connected in parallel to conductor 36. Typically, these strips are shown supported on opposite sides of a piece of dielectric material (shown in broken lines).

Strips 54 and 56 have wires 18 extending between photosensitive areas $A_1$ and $A_2$. These wires 18 provide a series connection between areas $A_1$ and $A_2$ in a manner precisely analogous to the construction previously illustrated in FIG. 2b.

Areas $A_1$ and $A_2$, however, no longer precisely correspond. Rather, they are offset in the plane of image movement, the areas $A_1$ being offset and to the left of the corresponding areas $A_2$.

Conductor 35 has connected thereto a plurality of conductive strips 55. Strips 55 in turn have a series of photosensitive areas $A_4$ thereon. Likewise, conductor 37 is connected in parallel to its strips 57. Strips 57 in turn support photosensitive areas $A_3$ attached thereto. These strips are interleaved between the respective strips 54 on plane $P_1$ and 55 on plane $P_2$ and supported out of electrical communication with their adjacent strips by the insulating material. Wires 18 provide a series connection between areas $A_3$ and $A_4$ in a manner analogous to that illustrated in FIG. 2b.

Areas $A_3$ and $A_4$, similar to areas $A_1$ and $A_2$, no longer precisely correspond. These areas $A_3$ and $A_4$ are offset in the plan of image relative movement in a direction opposite to the offset of areas $A_1$ and $A_2$. As here shown, the areas $A_4$ are offset and to the left of the corresponding areas $A_3$.

The series connections between the first group of offset photosensitive areas $A_1$ and $A_2$ and the series connections between the second group of oppositely offset photosensitive areas $A_3$ and $A_4$ can be made in a variety of ways. For example, printed or integrated circuit techniques could be used as illustrated in FIG. 3c.

FIG. 3c is a section of a photo-detector G similar to that schematically shown in FIG. 3a. In FIG. 3c, the desired offset between corresponding photosensitive areas $A_1$ and $A_2$ of planes $P_1$ and $P_2$ respectively, has been provided by a layered integrated circuit construction.

Transparent glass 61 has been provided adjacent plane $P_1$. Underlying this glass is a transparent conductive strip 63. Strip 63 has placed thereon at preselected intervals the photosensitive areas $A_1$ with intermediate areas of insulation 64 therebetween. Successive layers of insulating material 65, 66 and 67 are placed sequentially on top of the plane of material provided by photosensitive areas $A_1$ and dielectric material 64. These layers of insulation have dispersed therein conductors 68, 69 and 70, are in a stair-like configuration. Layer 72 of dielectric material and interspersed photosensitive elements $A_2$ cover layer 67. Overlying layer 67 is transparent conductive layer 73 and finally glass protective plate 74 to complete construction.

Function of the unit is believed apparent. Light impinging upon planes $P_1$ and $P_2$ excites the respective communicated photosensitive areas $A_1$ and $A_2$ to complete the series circuit through conductors 68, 69 and 70. As is apparent, by constructing a similar conductive stairway in an opposite direction between photosensitive elements on planes $P_1$ and $P_2$, respectively, a focus detector matrix similar to the matrix G schematically shown in FIG. 3a can be assembled.

Assuming that the photosensitive areas $A_1$ and $A_2$ on the one hand and $A_3$ and $A_4$ on the other hand are of photo-resistive cadmium sulfide, the current flow through conductors 34 and 36, and 35 and 37 will depend upon the proximity of the focused image plane relative to object O.

The focus detector of FIG. 3b can be substituted in the apparatus of FIG. 1 in such a manner that when the focused image plane of the base leg optical device B is beyond distance D to object O, sheared photosensitive areas $A_1$ and $A_2$ on planes $P_1$ and $P_2$ will become more conductive than oppositely sheared photosensitive areas $A_3$ and $A_4$. Current flow through conductors 34 and 36 will exceed current flow through conductors 35 and 37. Conversely, when the focused image plane is between object O and the base leg optical device, photosensitive areas $A_3$ and $A_4$ on planes $P_1$ and $P_2$, respectively, will be nearer the position of images $I_1$ and $I_2$. Current flow through conductors 35 and 37 will exceed current flow through conductors 34 and 36. Dependent upon whether the corresponding areas A and A or alternately areas $A_3$ and $A_4$ correspond most closely to the relative positions of images $I_1$ and $I_2$, differing current flows will be produced at conductors 34 and 36 on one hand and on 35 and 37 on the other hand. By the expedient of placing these conductors into separate portions of a bridge circuit, the direction of the focus plane correction required can readily be detected.

Referring to FIG. 4, a bridge circuit useful with this invention is illustrated. Understanding can be served best by first describing the bridge circuit, thereafter setting forth its operation.

Referring to FIG. 4, a bridge circuit is illustrated. The right-hand leg of the bridge circuit consists of center-tapped variable resistance $R_1$. The center tap is connected to the circuit bridge. The resistance from the center tap to one end comprises one resistive leg of the bridge circuit side; the resistance from the center tap to the other end provides the remaining resistive leg of the circuit side.

On the opposite side of the bridge circuit there is a center-tapped resistance $R_2$. Resistance $R_2$ between its center tap and lower end connects to conductor 34 and thence to the right sheared group of photosensitive elements $A_1$ and $A_2$. Conductor 36 is connected to an ammeter 40 connected in series to resistor $R_1$ to complete the lower end of the bridge circuit.

The upper end of the center-tapped resistance $R_2$ is connected to conductor 35 and thence through series connected photosensitive areas $A_3$ and $A_4$. Photosensitive areas $A_3$ and $A_4$ at conductor 37 are connected to resistor $R_1$ to complete the upper end of the bridge circuit.

Centrally of the bridge is volt meter V of high impedance. As will hereinafter be explained, the polarity of this volt meter indicates the direction between the distance to the triangulated image plane and the distance to the object detected.

Connected across the bridge circuit ends in parallel with both side legs of the bridge is a high impedance center-tapped resistance $R_3$. The center tap of resistance $R_3$ is connected directly to the bridge of the circuit. As will hereinafter be set forth, resistor $R_3$ serves to balance operation of the focus detector at low light levels.

Presuming that all elements of the bridge circuit illustrated in FIG. 4 are balanced, its operation can be readily understood. When the focused image plane is beyond the depth of field D of object O, the resistance between conductors 34 and 36 through series connected photoconductive elements $A_1$ and $A_2$ will be low. Conversely, the resistance between conductors 35 and 37 through series connected photosensitive elements $A_3$ and $A_4$ will be high. Consequently, the $R_1$ side of the volt meter V will be at high potential and the $R_2$ side of volt meter B will be at low potential.

Conversely, when the focus image plane is between distance D to object O and base leg optical device B, the effect will be reversed. The resistance between conductors 35 and 37 through series connected photosensitive areas $A_3$ and $A_4$ will be low. The resistance between conductors 34 and 36 through series connected photosensitive areas $A_1$ and $A_2$ will be high. Consequently, the $R_2$ side of volt meter V will have a high potential and the $R_1$ side of volt meter V will have a low potential.

It is thus seen that the polarity of volt meter V is directly related to the difference between the distance to the focused image plane and distance D of detected object O. Where the focused image plane is beyond the object, volt meter B will be of one (say positive) polarity. Conversely, where the focused image plane is between the depth of field of the object O and the base leg optical device, volt meter V will be of opposite (say negative) polarity.

Referring to FIG. 5, the voltage produced at the volt meter is plotted as a function of focus field location relative to object distance. As can be seen, when the focused field is short of the object field, voltages detected at the volt meter will be negative. Conversely, when the focused field is beyond the object field, voltage in the volt meter will be positive. It can thus be seen by connecting a servomechanism to lengthen the distance to the focused field when a negative voltage is detected and to shorten the distance to the focused field when a positive voltage is detected, immediate response of the focus detector to out-of-focus detected objects can be made. Such response will continue until the voltage at volt meter V drops to zero.

It should be apparent that varying shear increments can be provided between the respective series coupled photosensitive areas $A_1$ and $A_2$ on one hand and $A_3$ and $A_4$ on the other hand. Such varying shears will effectively control the range increment over which automatic focus will occur. As illustrated, where the shear is relatively large, the range increment or depth of field over which focus can occur will be relatively large. Conversely, where the shear is small, the increment over which focus can occur will be relatively small.

Returning to FIG. 4, two additional advantages of the circuit can be illustrated. First, the circuit can function to detect light intensity of the image plane focused. As the photoconductive path through each of the series connected photosensitive areas $A_1$ and $A_2$ on one hand and $A_3$ and $A_4$ on the other hand will be proportional to the light level of the image viewed, the current flow through an ammeter 40 connected in series with the conductor 36 will provide an indication of object illumination. As is common in the art, by connecting this current flow to an appropriate analogue circuit, shutter speed, aperture size, or both in programmed relation, can be automatically controlled in camera applications.

Additionally, variable resistors $R_1$, $R_2$ and $R_3$ provide for a convenient means of balancing the circuit, tuning the circuit to high intensity light and tuning the circuit to low intensity light, respectively.

Initially, the circuit will be balanced by adjusting the focus field to coincide with the object field and thereafter setting resistance $R_1$. Assuming that the object is illuminated with high intensity light and focused, it will be seen that the conductive path through the series connected elements $A_1$ and $A_2$ on one hand and $A_3$ and $A_4$ on the other hand will be of extremely low impedance. At this level of illumination, center-tapped variable resistor $R_2$ can be set for circuit balance. Conversely, when the focused object is at a low level of illumination, the conductive path through the series connected photosensitive areas $A_1$ and $A_2$ on one hand and $A_3$ and $A_4$ on the other hand will be of high impedance. Further, relatively large amounts of "dark noise" will be produced by the photosensitive element.

With this low level of object illumination, variable resistor $R_3$ can be adjusted to balance this dark noise. As it is likewise a resistance of high impedance, it will have little or no effect on this circuit in states other than low levels of object illumination.

The invention herein described in providing a grid of series connected corresponding photosensitive surfaces can admit of numerous alternative embodiments. One such embodiment is illustrated in FIGS. 6, 7 and 8.

Referring to FIG. 7, a simplified construction of two sheared photosensitive planes is illustrated. Dielectric substrate 90 is provided. Onto this substrate 90 the conductors 34 and 36 are laid. Conductor 34 traverses the top edge of substrate 90; conductor 36 traverses the bottom edge of substrate 90.

Extending downwardly from conductor 34 at equal spatial intervals are a series of vertical conductive elements 92. Similarly, extending upwardly from conductor 36 at corresponding spatial intervals are a series of vertically extending conducting elements 93.

Extending between each pair of upper vertical conductors 92 there is upper central conductor 94. Likewise, extending between each pair of lower vertical conductors 93 there is lower central conductor 95. A series connection between the upper central conductor 94 and the lower central conductor 95 is provided by sheared central connection 97. As illustrated in the embodiment of FIG. 7, sheared central connection 97 slants downwardly and to the right.

When the conductors 92–97 have all been placed on dielectric substrate 90, a photo-resistive cadmium sulfide coating is applied. Typically, the coating is applied at plane $P_1$ at the top of dielectric substrate 90 and at plane $P_2$ at the bottom of dielectric substrate 90. Such coatings can preferably occur by evaporative coating techniques.

Assuming that a potential is applied across the conductors 34 and 36, it will be seen that the strips of photosensitive material between conductors 92 form photosensitive areas $A_1$. These strips, however, are not divided in the Y axis; rather they extend the height of the image plane at a preselected X axis location. Similarly, the photosensitive material $A_2$ between vertical conductors 93 connected to conductor 36 forms a photosensitive area $A_2$. Area $A_2$ extends vertically the height of the image plane $P_2$ at a preselected X axis location.

Operation of focus detector H occurs in a manner precisely analogous to that illustrated with respect to focus detectors F and G. Referring to detector H of FIG. 7, assuming that images are placed on planes $P_1$ and $P_2$ at offset X axes locations, corresponding bright spots registered on photosensitive areas $A_1$ and $A_2$ will result in a minimum circuit impedance between conductors 34 and 36. This minimum impedance will occur when image $I_2$ on plane $P_2$ is sheared slightly to the right of image $I_1$ on plane $P_1$ of detector H.

The function of the focus detector J illustrated in FIG. 8 is precisely analogous to that of the focus detector H illustrated in FIG. 7. Typically, conductor 35 extending across the top edge of the dielectric substrate 90 has spaced vertical conductors 102 extending downwardly therefrom. Correspondingly, conductor 37 disposed along the bottom edge of dielectric substrate 90 has a series of upwardly extending vertical conductors 103. Intermediate of each of the conductors 102 is an upper central conducting member 104. Likewise, intermediate each of the lower vertical conductive members 103 is a lower central conducting member 105. Interconnection of the two conductive members is provided by sheared central connection 98, the shear here translating the lower image plane $P_4$ to the right of the upper image plane $P_3$ (this shear being the same as the shear of conductors 97 of detector H).

When a cadmium sulfide photo-resistive coating is placed over the image planes $P_3$ and $P_4$, corresponding photosensitive areas $A_3$ and $A_4$ are provided.

An optic device in which the respective detectors H and J are utilized is illustrated in FIG. 6. As illustrated, the two detectors are combined together with a beam splitter S to form detector assembly E.

Object O is shown being imaged through two convex lenses $L_1$ and $L_2$ of base leg optical device B. Tracing the respective light paths of lenses $L_1$ and $L_2$, the optics of the range finder can be easily understood. Converging light from lens $L_1$ impinges in turn upon mirror $M_1$, mirror $M_2$ and thence to the detector assembly E. Similarly, light from lens $L_2$ impinges upon mirror $M_3$, mirror $M_4$ and then to detector assembly E. As illustrated, light from lens $L_1$ is periscoped to the upward portion of detector assembly E. Conversely, light from lens $L_2$ is periscoped to the lower portion of detector assembly E.

In detector assembly E, detectors H and J are mounted at right angles one to the other. Detector H is mounted perpendicular to base leg 14 extending between lenses $L_1$ and $L_2$ in a plane parallel to the optic axis and extending generally from each of the lenses to the object O. Detector J is mounted in the plane of object O and base leg 14.

Bisecting the angle between detector H and detector J, there is beam splitter S. Splitter S serves to divide the light from each of the lenses $L_1$ and $L_2$, respectively. Accordingly, a first portion of the light from lens $L_1$ is reflected by splitter S to impinge upon plane $P_1$; the remaining portion of the light from lens $L_1$ is transmitted through splitter S to impinge upon plane $P_3$.

Light passing from lens $L_2$ to the lower portion of detector assembly E is precisely analogous. Typically, a portion of the light will be reflected by splitter S onto image plane $P_2$. The remaining portion of the light will be transmitted through splitter S onto plane $P_4$.

Assuming that base leg optical device B is focused on a plane beyond the distance D to object O, it will be seen that image $I_1$ as focused on plane $P_1$ will move in the direction of arrow 112. Conversely, image $I_3$ focused on plane $P_3$ will move in the direction of arrow 114. Both images will move so that the stick figure of the man from object O is oriented to a central position on the respective image planes.

The movement of the images $I_2$ and $I_4$ from lens $L_2$ will be precisely opposite. Image $I_2$ of object O on plane $P_2$ will move in the direction of arrow 116. Conversely, image $I_4$ on plane $P_4$ will move in the direction of arrow 118. These images will move so that the tree becomes the central object of the image planes. When the focused plane through lenses $L_1$ and $L_2$ is between the plane of object O and base leg optical device B, the image movement will be precisely the reverse of that illustrated.

Assuming that leads 34, 35, 36 and 37 of detectors H and J are connected in the circuit of FIG. 4, the potential of volt meter V as a function of the focused range relative to distance D of object O will be analogous to that shown in FIGS. 4 and 5. Where the focus field is beyond the object distance, a positive voltage will result. Where the focus field is short of the object distance, a negative voltage will result.

Changing of the focused field can be accomplished in numerous ways similar to that illustrated with respect to FIG. 1. For instance, mirror $M_1$ could be rotated about an axis 16 vertical to both base leg 14 and distance D to object O. Alternately, the lenses $L_1$ and $L_2$ could be moved towards and away from one another.

When detector assembly E is used, however, relative movement of the images with respect to one another can be accomplished by rotation of the detector assembly E. It will be remembered that when the focused plane was beyond object O, images $I_1$ on plane $P_1$ and image $I_3$ on plane $P_3$ moved away from one another. Such movement took place in the direction of arrow 112 in the case of image $I_1$ and arrow 114 in the case of image $I_3$. Conversely, image $I_2$ on plane $P_2$ and image $I_4$ on plane $P_4$ moved towards one another. Such movement occurred in the direction of arrow 116 in the case of image $I_2$ and in the direction of arrow 118 in the case of image $I_4$. The problem therefore becomes that of producing rotational motion of detector assembly E which will counteract such image motion. Typically, such rotation is provided by rotating assembly E about an axis 127 attached to the backside of detector J.

Regarding the axes 127, it will be noted that the converging light from lens $L_1$ and the converging light from lens $L_2$ strike beam splitter S on a longitudinal axis 125. Typically, axis of rotation 127 is positioned to be midway between the point where the respective light bundles impinge upon beam splitters and chosen to be aligned normally to the plane of detector J. This position provides optimum image movement over a range of up to 6° angular movement required for positioning of images $I_1$ through $I_4$.

When the focused image plane is beyond the distance D to object O, image movement in opposition to the respective arrows 112 and 114 on one hand, and 116 and 118 on the other hand is necessary. Typically, detector assembly E is rotated in the direction of arrow 130 about axis 127. Such rotation continues until image $I_1$ on plane $P_1$ registers overlying image $I_2$ on plane $P_2$ and image $I_3$ on plane $P_3$ registers overlying image $I_4$ on plane $P_4$. When such registration has occurred, the respective photosensitive areas $A_1$ through $A_4$ detect the registration through the operation of the circuit described with reference to FIGS. 4 and 5. Naturally, where the focused image plane is between objects O and base leg optical device B, rotation of the detector assembly E in the opposite direction must occur to produce image alignment. By the expedient of calibrating the angular position of the detector assembly to the distance of the focused image plane, range, focus, or both can be conveniently detected.

The detector assembly E illustrated in FIG. 6 has advantages that may not be immediately apparent. Two such advantages are illustrated with respect to FIGS. 9 and 10.

Referring to FIG. 9, top and bottom image planes $P_1$ and $P_2$ are shown each having arcuate conductors 135 are curved in a first slope and generally extend in the Y axis of the plane. On plane $P_2$, arcuate conductors 135 are generally curved in a second and opposite slope and again generally extend in the Y axis.

When interconnected by sheared conductors 136, it will be seen that the arcuate conductors 135 on planes $P_1$ and $P_2$ have small shear in the center of the planes and large shear at the top and bottom edges of the planes. As can be seen with reference to FIG. 5, this will allow border focusing of the picture frame over relatively large depths of field but will restrict center focusing of the image plane to relatively small depths of field.

Referring to FIG. 10, yet another useful embodiment of detector assembly E is illustrated. In FIG. 10 a plurality of sloped conductors 140 are shown interconnected by sheared conductors 142. As can be seen with reference to the Figure, the image plane $P_1$ is moved towards the top of dielectric plate 90 and image plane $P_2$ moved towards the bottom of dielectric plate 90, a relatively large shear between the two image planes results. Consequently, the detector assembly will be sensitive to focus over a relatively large range increment.

Conversely, if the two image planes $P_1$ and $P_2$ are shifted towards one another (as shown in the planes outlined in broken lines and labeled $P'_1$ and $P'_2$) a small shear between the respective images will result. This small shear will restrict the sensitivity of the focus detector over a small range increment. This simple adjustment in shear can be made by swinging the periscope of mirrors $M_1$ and $M_2$ or alternately $M_3$ and $M_4$ to move the images relative to one another along a vertical axis substantially parallel to the axis 125 on beam splitter S.

It will be noted that the focus detector matrix utilized with this invention has been illustrated in two basic forms. One form of this matrix has included a grid of uniformly sized photosensitive areas (see FIGS. 2a, 2b, 3a, 3b and 3c). The other form has included strips of photosensitive material aligned normally to the direction of relative image movement (see FIGS. 7, 8, 9 and 10). It should be apparent to the reader that uniformity of size between the photosensitive areas is not required. Moreover, photosensitive detector elements can be constructed utilizing a combination of strips of varying sizes, areas of various sizes or both.

The connection between the corresponding photosensitive areas on each image plane has thus far been illustrated as a series circuit. This connection is preferred. It will be realized, however, that the electrical interconnection between corresponding electrically interconnected photosensitive areas could assume numerous forms, the only limitation being that electrical correspondence be maintained to provide a pair wise response between the corresponding photosensitive areas.

Likewise, the separate series circuits interconnecting the photosensitive areas have been all illustrated connected in parallel to measure the aggregate current flow between the electrically connected and corresponding photosensitive areas on each image plane. It will be appreciated that virtually any interconnection which will measure the aggregate current flow between the corresponding photosensitive areas can be substituted for the illustrated parallel circuits.

In the photodetectors illustrated in FIGS. 2a, 2b, 3a, 3b, 7, 8, 9, and 10 the photosensitive elements extending between each of the planes were connected in series circuits and their current flow aggregated through parallel circuits. This type of focus detector is preferred in the detection of light objects in darker fields.

Where dark objects are to be focused on a largely illuminated field, the focus detector previously illustrated may not produce sufficient current to detect focus.

Referring to FIG. 11, a focus detector is illustrated in which the photoconductive elements on each of the corresponding planes are connected in parallel and the current flow of the photoconductive elements aggregated by a series circuit. This is the opposite of the electrical connections heretofore illustrated and is suitable for detecting dark objects on an illuminated background.

Illustrating specifically the construction of the focus detector of FIG. 11, it will be seen that the detector includes a series of stacked rectangular insulation plates 150. Plates 150 are oriented on top of one another so as to form a thin wafer-like member. Plates 150 define at their edges the planes on which the images are projected for comparison. As illustrated in FIG. 1, the edges of plates 150, exposed to view, form the first imaging plane $P_1$. The opposite edges of the plates 150, unexposed to view, form the plane for the projection of the second image $P_2$.

Parallel connection between corresponding areas on plane $P_1$ and corresponding areas on plane $P_2$ is effected by conductors 152. Conductors 152 are placed on plates 150 in rows. These rows are each aligned so that one end of the conductors 152 is exposed at plane $P_1$ and the other end of each conductor 152 is exposed at plane $P_2$. It will thus be seen that conductors 152 afford parallel electrical communication between corresponding areas on each of the image plane $P_1$ on one hand and $P_2$ on the other hand.

The interval between the ends of the conductors exposed on plane $P_1$ is filled with photoconductive material. Likewise, the interval between the ends of each of the conductors exposed to plane $P_2$ is filled with photoconductive material.

Having established corresponding photosensitive areas on each of the planes in parallel electrical communication, the aggregation of current flow in a series electrical connection must be obtained. Accordingly, alternate conductors 152 on the right hand side of the focus detector are connected in series by connectors 155. Similarly, alternate conductors 152 on the left hand side of the focus detector are connected in series by connectors 156. By the expedient of allowing a conductor 156 to bridge one plate 150 and a conductor 155 to bridge the next plate 150 therebelow a series connection of all the photosensitive areas 153 throughout the focus detector occurs.

Operation of the focus detector of FIG. 11 can be readily understood. Where a dark spot is registered on photoconductive areas 153 which are not in parallel electrical communication through conductors 152, electrical communication through the focus detector will remain substantially unchanged. The large illuminated backgrounds on each of the planes $P_1$ and $P_2$ will permit communication of the electrical current through the focus detector.

Where, however, dark spots are registered on plane $P_1$ on one hand and plane $P_2$ on the other hand and almost total interruption of the current flow through photoconductive material will be obtained. It will be observed that a registered dark spot on photoconductive material will completely interrupt the series circuit provided by the focus detector shown in FIG. 11.

The focus detector of the type illustrated in FIG. 11 has several advantages which are not immediately apparent. First, it is not necessary in this type of focus detector that two image planes $P_1$ and $P_2$ be used. Rather, separate images can be projected on the same plane in side by side relation.

An additional advantage of the focus detector of the type illustrated in FIG. 11 is that the projection of the separate images from the image plane need not occur from separated and paired viewing points. A lens which has a large surface area can be used for the equivalent of such paired viewing points. Accordingly, a range finder illustrating this use of the focus detector of FIG. 11 is illustrated specifically in FIG. 12.

Referring to FIG. 12, an object O is shown focused through a large lens Q onto plane $P_1$ of the focus detector previously illustrated in FIG. 11. Provision is made for moving the focus detector towards and away from the large lens Q by apparatus not shown.

Lens Q can be conveniently described by analyzing the effect of the lens on light emanating from object O at two discrete segments. These segments are left hand lens segment 160 and right hand segment 161.

Lens Q is a standard convex lens which serves to converge and focus light received from object O to an image on plane $P_1$. As is schematically illustrated, light from object O passing through left hand lens segment 160 impinges on plane $P_1$ of the focus detector to form image $I_1$. Similarly, light from object O passes through right hand lens segment 161 and impinges on plane $P_1$ to form image $I_2$. Observing image $I_1$ relative to image $I_2$, it will be apparent that plane $P_1$ is between the focal point of lens Q and lens Q itself.

Remembering that object O consists of a dark object on a substantially illuminated background, the operation of the focus detector can be readily understood. Assuming that an electrical potential is applied across the focus detector at connections 157, it will be seen that the area occupied by image $I_1$ on plane $P_1$ will be a product of light passing through left hand lens segment 160 and light passing through right hand lens segment 161. The light passing through left hand segment 160 will result in the projection of the dark outline of the image on plane $P_1$. The light passing through right hand segment 161, however, will result in the illuminated background being superimposed upon the dark projected image $I_1$. Accordingly, the focus detector will see a partially illuminated area at most points where image $I_1$ is projected.

The projected image $I_2$ will be analogous. Light passing from object O through right hand lens segment 161 will result in the dark outline of the image being projected at image $I_2$. However, this dark image will be illuminated by the illuminated background of object O. Light passing from object O through left hand lens segment 160 will illuminate most portions of the image $I_2$ as they appear on plane $P_1$.

When, however, the plane $P_1$ is moved away from lens Q registry of image $I_1$ will occur with image $I_2$. The images projected on plane $P_1$ will overlie one another. In this physical state image $I_1$ will no longer be illuminated by the bright background of image $I_2$. Likewise image $I_2$ will no longer be illuminated by the bright background of image $I_1$. Consequently, the series connected photoconductive surfaces will experience substantial interruption of the circuit defined between connections 157.

The focus detector described in FIG. 11 has been illustrated without any sheer being incorporated between plane $P_1$ on one hand and plane $P_2$ on the other hand. Naturally, by providing a slant to the conducted elements 152, the effects of image displacement previously illustrated with respect to FIGS. 4 and 5 can be obtained. Indications of the direction of focus required can be detected without the necessity of a hunting circuit.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention.

I claim:

1. A device detecting image coincidence between two images taken from spaced-apart positions of a substantially identical field comprising: first and second parallel and spaced apart back to back planes upon which back to back images of the field from each point is formed on the first and second planes respectively, means dividing each plane into a matrix of discrete electrically isolated areas in which each area on one of the planes is comparable to a similar area on the other of the planes with reference to the field, photoelectric transducer means formed at each area on each of said planes, means for connecting the photoelectric transducer means of comparable areas on each of the planes in separate series electrical circuits including a plurality of discrete conductors disposed from a comparable area on said first plane to a comparable area on said second plane; and means for measuring the aggregate current flow in said series circuits for detecting a first current flow measurement at image coincidence on said planes and second and different current measurement flows at image noncoincidence.

2. The combination of claim 1 and wherein said discrete electrically isolated areas on said first plane are offset a predetermined amount to receive a different and adjacent segment of said field relative to said comparable electrically isolated areas on said second plane when images are superimposed on said planes in precise back to back relation.

3. The combination of claim 1 and wherein said photoelectric transducer means are photo-resistive transducer means.

4. The combination of claim 1 and where each of said image planes has photoelectric transducer means comprising a continuous coating of photosensitive material on said image planes and said means dividing each plane into a matrix of discrete electronically isolated areas includes first and second conductors extending over said first and second planes respectively defining open non-conductive areas adjacent each of said comparable areas.

5. The combination of claim 1 and wherein said means for measuring the aggregate current flow includes means for electrically connecting each of the separate series circuits between comparable areas on each of the planes in a parallel circuit.

6. Apparatus for comparing paired images of an object comprising: first and second image planes; means for projecting one of said paired images on one of said planes and the other of said images on the other of said planes; means for dividing the surface of said planes into a matrix of first and second groups of paired corresponding discrete electrically isolated areas with respect to said projected images, the areas of said first group on said first and second image planes being offset in a preselected direction to receive a different and adjacent segment of each of said images with respect to the areas of said second group on said first and second image planes; phototransducer means formed at each area on each of said planes; first means for connecting the transducer means at corresponding areas in said first group in first separate electrical circuits extending between said first and second planes, second means for connecting the transducer means at corresponding areas in said second group in second separate electrical circuits extending between said first and second planes, first means for measuring the aggregate current flow in said first circuits; and second means for measuring the aggregate current flow in said second circuits.

7. A base leg optical device including: first and second planes with each plane disposed for receiving first and second images of a focused object; means for defining first and second spatially separated light paths, each light path being focused at said first and second planes; each said image plane having first and second matrices of discrete electrical photosensitive areas thereon, said first matrix on each said plane disposed to receive an image from said first light path and said second matrix on each said plane disposed to receive an image from said second light path; means for electrically connecting corresponding photosensitive elements in corresponding image locations on said first matrix on each of said planes to corresponding photosensitive elements in corresponding image locations on said second matrix on the same plane: means for aggregating the electrical current flow of said connected photosensitive elements of both said image planes; means for applying an electrical potential across said aggregated and connected photosensitive elements; and means for monitoring changes in the electrical state of said circuit responsive to changes in positions of said first and second images.

8. In a base leg optical device having means for focusing images received from two viewing points, the combination comprising: first and second light paths from each said viewing points; means in each said light path for focusing paired images at separate focal points; first image plane disposed at one of the focal points from each of said light paths; a second image plane disposed at the remaining focal points from each of said light paths; means for defining on each image plane first and second matrices of discrete electrically isolated areas; phototransducer means at each isolated area on each of said planes, means for connecting corresponding image located electrical areas on each plane in separate electrical circuits; and means for aggregating the flow of said separate electrical circuits on each plane.

9. The apparatus of claim 8 and including means for rotating said first and second image planes about an axis between said viewing points of said optical device.

10. A focus detector comprising in combination: a dielectric plate having a first area for receiving a first image, a second area for receiving a second image, and a spatial interval therebetween; a plurality of first side by side conductors on said first image area extending at least partially across said first area and electrically connected in parallel; a plurality of second side by side conductors on said second image area extending at least partially across said second area and electrically connected in parallel and substantially parallel to said first side by side conductors; a plurality of third conductors placed between each of said first conductors on said first area and said second conductors on said second area and spanning the spatial interval of said dielectric plate therebetween; and a photosensitive coating applied over said dielectric plate and between said conductors.

11. The invention of claim 10 and wherein said third conductors as extending between said first and second conductors electrically connect non-corresponding portions of said image areas.

12. The apparatus according to claim 10 and wherein all said first and second side by side conductors are arcuate.

13. In combination: a base leg optical device having means for receiving and projecting two images taken from spaced-apart positions of a field of view; a pair of planes, each plane disposed to receive an image from said base leg optical device; means for dividing the surface of said planes into a matrix of first and second groups of paired corresponding discrete electrically isolated areas, the areas of said first group being offset in a preselected direction with respect to the areas of said second group with respect to the field of view on each of said image planes; phototransducer means formed at each area on each of said planes; first means for connecting the transducer means at corresponding areas in said first group in first separate electrical circuits; second means for connecting the transducer means at corresponding areas in second group in second separate electrical circuits; and a bridge circuit having first and second legs for comparing first and second current flows; first means for aggregating the current flow of said first separate electrical circuits into one leg of said bridge circuit, and second means for aggregating the current flow of said second separate electrical circuits into the other leg of said bridge circuit and means connected to said bridge circuit for indicating the comparative current flow in said first and second legs.

14. In combination: a range finder including a plane for receiving images of a focused object; lens means positioned on an optical axis intermediate said plane and said focused objects, said lens means having a first segment for defining a first light path between said object and said plane and a second segment for defining a second light path between said object and said plane; means for moving the focal plane of said lens means towards and away from said lens; said plane having a matrix of electrical photosensitive areas thereon; means for electrically interconnecting photosensitive elements on said plane in a series circuit; means for applying an electrical potential across said circuit of photosensitive areas, and, means for monitoring changes in the electrical state of said series circuits.

15. Apparatus for comparing paired images of an object comprising: first and second image planes; means for projecting one of said paired images on one of said planes and the other of said images on the other of said planes; a plurality of first side by side conductors on said first image plane extending at least partially across said first image plane and electrically connected in parallel; a plurality of second side by side conductors on said second image plane extending at least partially across said second image plane and electrically connected in parallel; a plurality of third conductors, each third conductor placed between said first conductors on said first image plane at one end and placed between said second conductors on said second image area at said second end; a photosensitive coating applied over said dielectric plate between said conductors; and means for measuring the aggregate current flow in said conductors.

* * * * *